Figure 1A:
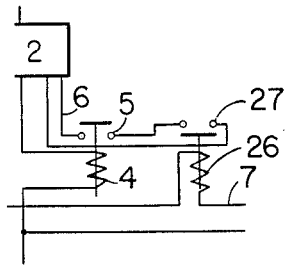

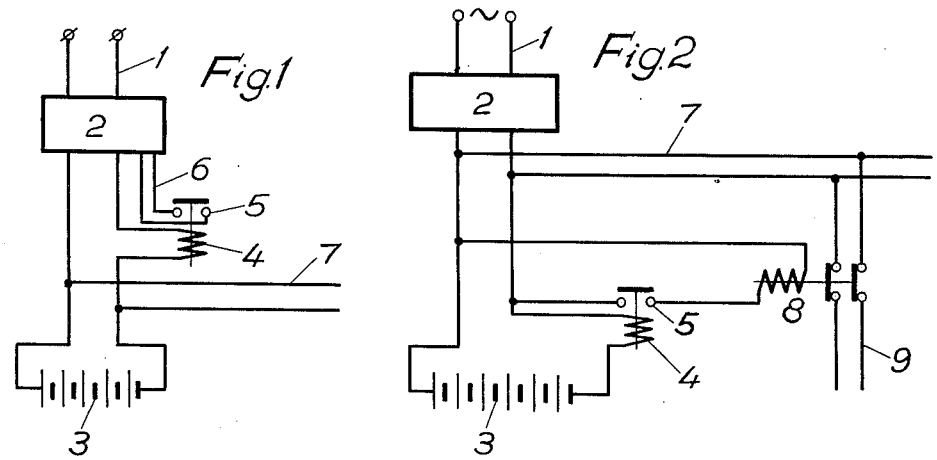
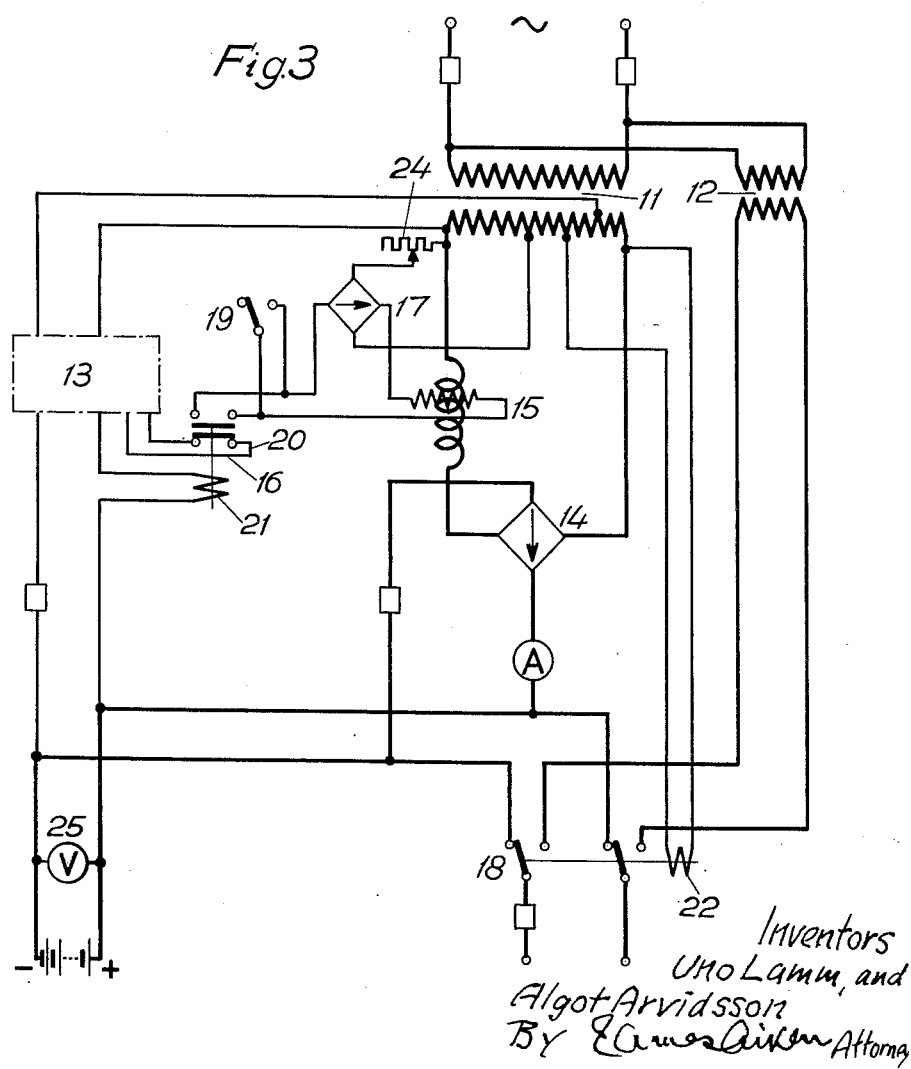

INVENTORS:
UNO LAMM
ALGOT ARVIDSSON
BY
ATTORNEY

Patented Dec. 9, 1952

2,621,316

UNITED STATES PATENT OFFICE

2,621,316

ARRANGEMENT FOR CHARGING OF ELECTRIC ACCUMULATOR BATTERIES

Uno Lamm and Algot Arvidsson, Ludvika, Sweden, assignors to Allmänna Svenska Elektriska Aktiebolaget, Vasteras, Sweden, a Swedish corporation Application September 10, 1947, Serial No. 773,196
In Sweden November 18, 1943

Section 1, Public Law 690, August 8, 1946
Patent expires November 18, 1963

8 Claims. (Cl. 320—10)

A reliably, automatically acting arrangement for the charging of electric accumulator batteries has not hitherto been possible because an entirely reliable indicator of the charging state of the battery has not been available. In simple arrangements, for instance, for the charging of batteries in automobiles driven by internal combustion motors, the charging of the battery, due to the lack of better means, has been controlled in dependence on the charging voltage of the battery in spite of the fact that this is a very unreliable indicator of the charging state of the battery.

The present invention has for its object to provide an improved arrangement for controlling the charging of an accumulator battery and is chiefly characterized in that, while the battery is connected to a rectifier which has a regulator comprising a direct current saturable inductance and acting to regulate to accurately constant voltage of the rectifier, the control of the load is at the same time performed by means of a current responsive member inserted in the circuit between this current source and the battery, which member in dependence on the magnitude of the current flowing from the rectifier to the accumulator directly or indirectly controls the charging. The invention is based upon the knowledge that, if the battery is connected to a current source with a practically constant voltage, the current delivered to the battery from this current source, within certain voltage limits, is a measure of the charging state of the battery and can therefore be utilized for connecting and disconnecting members, which have an influence on the charging without the risk of detrimental overcharging or insufficient charging.

The current responsive member which may be a current relay or a tilting (discontinuously acting) transductor of the type shown in British Patent 499,960 or a member actuated by it may actuate the charging of the battery in different ways. The current responsive member may influence the rectifier, in the circuit of which it is inserted, so that, when the current through it reaches a certain maximum value, the voltage of the rectifier is raised, so that the charging current is increased. Upon an increase in the charging the current decreases, due to the fact that the voltage of the battery then is raised and when the current from the rectifier has decreased to a certain minimum value, the current responsive member again actuates the regulating member of the rectifier, so that the voltage is restored to the original level.

Instead of dimensioning this current source so that it can itself perform the main charging, it is also possible that the current responsive member may connect with another current source for this purpose, whereas the rectifier with the exactly regulated voltage has for its object to give the maintenance charging and in this case the voltage of the rectifier, to which the current responsive member is connected, is raised in the same manner as in the arrangement above described. The rectifier, regulated to constant voltage, also serves in this case for the maintenance charging together with the current responsive member only as an indicator of the charging state.

In certain cases it may occur that the battery is loaded with members, which are unable to withstand the higher voltage necessary for the charging of the battery and in such cases these members may be disconnected by a special contact, when the charging begins, but it is also possible to provide that, if these members only temporarily connected in, the charging of the battery is interrupted during the time when these members are so connected. Such loading members may for instance be especially sensitive relays which cannot withstand the overvoltage used for the charging.

On the accompanying drawings: Figs. 1, 1a, 1b, 2 and 3 show different forms of arrangement according to the invention.

Fig. 1 shows an arrangement for charging of an accumulator battery, where the current responsive member is arranged, when the battery is entirely or partly discharged, to increase the voltage of a rectifier, intended for the charging and with an exactly regulated voltage. Fig. 2 shows an arrangement with a rectifier, which is regulated to constant voltage and provided with a current limiting device, in which the current responsive member performs the disconnection of a part of the load, so that the charging is accelerated since the part of the current available for the battery is increased. Fig. 3 shows an arrangement especially intended for the charging of the battery of an emergency lighting plant and in this arrangement besides the rectifier with exactly regulated voltage a further larger rectifier is arranged for a comparatively rapid charging of the battery.

Figure 3A:
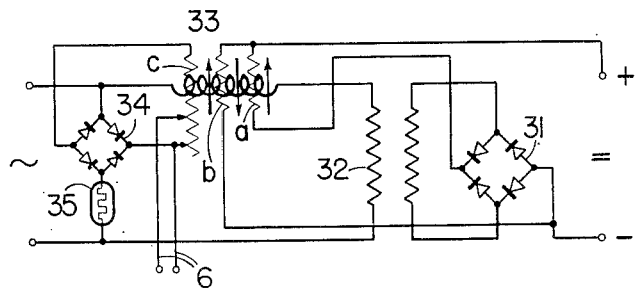

Fig. 3a is a detail diagram of the voltage regulator.

In Fig. 1, 1 designates the connection to an alternating current network and 2 is a rectifier, which in known manner, for instance by an electromagnetic regulator or by direct current saturated inductances, is regulated to give a constant direct voltage. 3 is the accumulator battery and 4 a current relay inserted in the circuit between the rectifier and the battery, the working contacts 5 of the relay being arranged to close a circuit 6 of the regulator for changing the voltage level of the rectifier. 7 are the conductors leading to the objects constituting the load of the battery.

In Fig. 1a, a pair of contacts 27 of a relay having a coil 26 are connected in series with the contacts 5. The coil 26 is connected in series in one of the conductors 7 feeding the load. When a current flows through the said coil, indicating that a load is on, the contacts 27 block the circuit through the contacts 5.

Figure 1B:
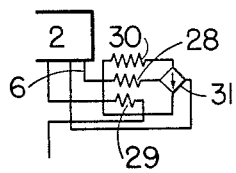

In Fig. 1b, the relay 5, 6 is replaced by a transductor having an alternating current winding 28, a direct current winding 29 fed by the current in the conductors 6, and another direct current winding 30 fed through a rectifier 3 by the alternating current traversing the winding 28. The winding 30 has more turns than the winding 28, whereby, in a manner known per se, the alternating current will rise in a discontinuous manner from a low to a high value when the current in 29 exceeds a certain value.

In Fig. 2, 1 designates the connection with the alternating current network and 2 the rectifier and 3 the battery and 4 the current responsive member. The contacts 5 of this member 4 are arranged to function, in dependence upon the current through the current responsive member 4, and to close and open a breaker 8 for a part of the load of the battery connected to it by the conductors 9.

In Fig. 3, 11 designates a transformer, through which an emergency lighting battery with its charging rectifiers is connected to an alternating current network. 12 is a transformer, through which the emergency lighting plant is connected to the alternating current network, as long as this is under voltage. When its voltage disappears, the lighting plant is connected to the battery 25 by means of the contactor 18 due to the disappearance of the current through its operating coil 22, which is connected to the secondary winding of the transformer 11. The battery 25 is connected to the transformer 11 on the one hand across the rectifier 14 and on the other hand across a so-called avostat regulated rectifier 13, i. e. a rectifier, which, by means of direct current saturated inductances, is regulated to give a practically constant voltage up to a certain current and then a constant current. The rectifier 14 is connected to the transformer 11 across a transductor or direct current saturable reactor 15, which receives its direct current excitation from a rectifier 17 over contacts in a relay 16, the operating coil 21 of which is inserted in the circuit between the battery 25 and the rectifier 13. The regulating arrangement contains a circuit 20, which is connected to two contacts on the relay 16 and acts so that, when said circuit is opened, the rectifier 13 is regulated up to a higher voltage level corresponding to the voltage of the battery in the charged state, whereas, when this circuit 20 is closed, the rectifier 13 is regulated to give a voltage, suitable for the maintenance charging of the battery 25. 19 is a circuit breaker, which can be closed by hand in the event that a charging of the battery 25 is desired without use of the automatic regulation and 24 is an adjustable resistance, by which the current delivered from the rectifier 14 can be regulated.

Fig. 3a shows the details of rectifier 13, these being as shown on page 23 of the well-known dissertation of the inventor Uno Lamm hereof, "The Transductor, D. C. Pre-Saturated Reactor, With Special Reference to Transductor Control of Rectifiers," 1943. The relay comprises a transductor 33 provided with a self-excitation winding $a$, a winding $c$ carrying a constant gauge current supplied by a rectifier 34 fed through a constant current resistor 35 and a winding $b$ connected to the direct current voltage to be regulated. The current traversing the alternating current winding of the transductor is led through a transformer 32 and finally rectified in a rectifier 31. The relay 21 according to the present invention short-circuits for instance a portion of the winding $c$ by connections 6.

The arrangement acts in the following way. If the voltage of the alternating current network disappears, the contactor 18 is deenergized, as the current through its coil 22 disappears. Its movable contacts are then moved to the left, so that the emergency lighting plant instead of being connected to the transformer 12 is connected to the battery 25. When subsequently, the voltage of the alternating current network is restored, the emergency lighting plant is connected with the transformer 12. As the discharging voltage of the battery 25 has been lowered, whereas the voltage of the rectifier 13 is constant, the current through the coil 21 will increase, so that the contacts of the relay 16 are moved upwards and the circuit through the rectifier 17 and the transductor 15 is closed. By this the inductance of the transductor 15 is lowered, so that the rectifier 14 will give a constant charging current to the battery 25. When the contacts of the relay 16 move upwards, the circuit 20 is interrupted thus causing the voltage of the rectifier 13 to be set to a value corresponding to the full charging voltage of the battery 25. By thus increasing the current through the battery, the relay 16 is maintained energized, but when the battery 25 is charged, the current in the circuit between the rectifier 13 and the battery 25 is decreased and when this current has reached a certain low value, the relay 16 is actuated, so that its contacts are moved downwards. The direct current circuit of the transductor 15 is thus interrupted, so that the current to the battery from the rectifier 14 disappears and at the same time the circuit 20 is closed, with the result that the voltage of the rectifier 13 is changed to a value suitable for the maintenance charging.

This voltage is so chosen that, when the battery is not loaded, it will be traversed by a charging current of a few milliamperes, which is sufficient for preventing damage to the battery by sulphation, when lead accumulators are used, but will not be detrimental to the battery by oxidation. Also when alkaline batteries are used, this small current is sufficient for maintaining the charging state of the battery but will not cause any loss of the electrolyte.

We claim as our invention:

1. A storage battery charging means, comprising a rectifier having input terminals for connection to an alternating current source and direct current output terminals for connection to a battery, a voltage regulator in circuit with said rectifier so constructed as to keep the voltage fed by said charging means practically constant as long as any countervoltage on said output terminals exceeds a predetermined amount, a current responsive relay in the circuit, and means controlled by the relay and responsive to a decrease in such countervoltage below such value producing an increase in the current in said relay above a predetermined limit for partially disabling said voltage regulator so as to raise in a discontinuous manner the voltage fed by said rectifier.

2. Means according to claim 1, in which said relay is traversed substantially only by the charging current of the battery when said current exceeds such predetermined limit.

3. Means according to claim 1, in which said relay is traversed only by the charging current of the battery when said current exceeds such predetermined limit.

4. Means according to claim 1 in which said constant voltage is identical to the voltage adapted for a trickle-charging and said raised voltage is identical to the voltage necessary for complete charging.

5. Means according to claim 1 including devices so connected as to be temporarily fed by said rectifier in parallel with said output terminals and means responsive to the feeding current of said devices and arranged to interrupt the charging.

6. Means according to claim 1 comprising a second rectifier and means to connect said second rectifier in parallel to said first rectifier when the voltage of said first rectifier is discontinuously raised.

7. Means according to claim 1 comprising a second rectifier and means to connect said second rectifier in parallel to said first rectifier when the voltage of said first rectifier is discontinuously raised, a reactor connected in series with the second rectifier, a saturating direct current winding on said reactor, and a current responsive member included in the circuit feeding said output terminals so connected as to close a circuit through said saturating winding.

8. Means according to claim 1, including a rectifier, in which the current responsive relay consists of a direct current saturable reactor having a direct current winding so connected as to be fed by a direct current from the output terminals of such rectifier, means connecting the input terminals of the rectifier in series with the alternating current winding of the reactor, the reactor having a number of winding turns sufficient to cause a discontinuous change of the reactor current from low to high values.

UNO LAMM.
ALGOT ARVIDSSON.

REFERENCES CITED

The following references are of record in the file of this patent:

UNITED STATES PATENTS

| Number | Name | Date |
|---|---|---|
| Re. 19,848 | Beetem | Feb. 11, 1936 |
| 1,301,622 | Turbayne | Apr. 22, 1919 |
| 1,791,156 | Beetem | Feb. 3, 1931 |
| 1,882,473 | Beetem | Oct. 11, 1932 |
| 1,962,484 | Dannheiser | June 12, 1934 |
| 1,995,637 | Day | Mar. 26, 1935 |
| 1,995,652 | Reichard | Mar. 26, 1935 |
| 2,085,061 | Aggers | June 29, 1937 |
| 2,114,827 | Aggers | Apr. 19, 1938 |
| 2,139,330 | Gilson | Dec. 6, 1938 |
| 2,179,299 | Murcek | Nov. 7, 1939 |
| 2,237,253 | Rosnell et al. | Apr. 1, 1941 |
| 2,300,296 | Langabeer et al. | Oct. 27, 1942 |
| 2,306,998 | Claesson | Dec. 29, 1942 |
| 2,322,955 | Perkins | June 29, 1943 |
| 2,333,617 | Smith | Nov. 2, 1943 |
| 2,334,528 | Amsden | Nov. 16, 1943 |
| 2,337,253 | Lamm | Dec. 21, 1943 |
| 2,431,311 | Cronvall | Nov. 25, 1947 |
| 2,431,312 | Cronvall | Nov. 25, 1947 |

FOREIGN PATENTS

| Number | Country | Date |
|---|---|---|
| 56,741 | Denmark | Sept. 18, 1939 |
| 123,411 | Great Britain | Feb. 25, 1919 |
| 499,960 | Great Britain | Jan. 30, 1939 |
| 775,892 | France | Oct. 22, 1934 |

OTHER REFERENCES

Pamphlet issued by the General Electric Co. regarding their regulator Type TA Form K20, issued in May of 1929.

The Transductor, D. C. Pre-Saturated Reactor, with Special Reference to Transductor-Control of Rectifiers, pages 27 and 28, first published in 1943 in Stockholm.